UNITED STATES PATENT OFFICE.

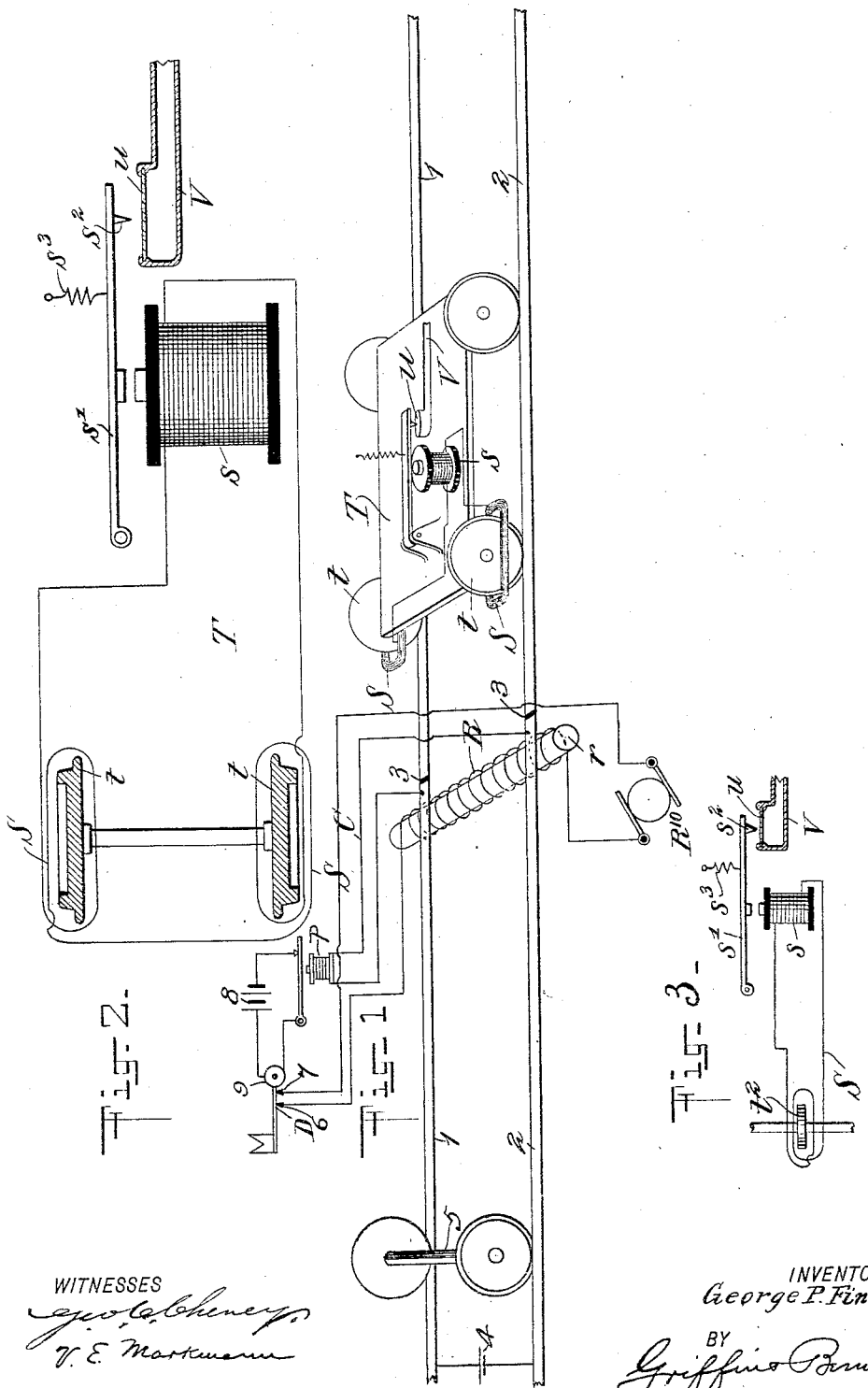

GEORGE P. FINNIGAN, OF WILTON-ON-JAMES, VIRGINIA.

INDUCTION SYSTEM OF TRAIN CONTROL.

1,159,315.     Specification of Letters Patent.     Patented Nov. 2, 1915.

Application filed July 21, 1908. Serial No. 444,570.

*To all whom it may concern:*

Be it known that I, GEORGE P. FINNIGAN, a citizen of the United States, residing at Wilton-on-James, county of Henrico, State of Virginia, have invented an Induction System of Train Control, of which the following is a specification.

My invention relates to a system for inductively controlling a translating device, such as signaling means, speed controlling means, or the like, to effect indications or controls in connection with the movements of a train, car, or other moving vehicle. To these ends I preferably employ a circuit a part of which or a coil in which surrounds a para-magnetic mass movable with the vehicle in contact with a para-magnetic mass disposed in the path of travel of the vehicle. The moving para-magnetic mass may be a vehicle wheel rolling in contact with the usual iron or steel rail with which may be associated means for changing the magnetic flux through the wheel coil or circuit in which is generated current affecting or controlling the translating device. It will be understood, however, that my invention is not limited in the above respects except where so specified in the claims.

For an understanding of my invention reference may be had to the accompanying drawing; in which:

Figure 1 is an illustration of a system embodying my invention. Fig. 2 is a diagrammatic view illustrating the control circuit and associated parts. Fig. 3 is a diagrammatic view illustrating a modified construction.

In Fig. 1, 1 and 2 represent the running rails of a railway, each of these rails being divided into blocks or sections insulated from each other at 3. A battery or other source of current 4 has its terminals connected to the rails 1 and 2 of the left hand block or section and at the right end of the said block or section the terminals of relay P are connected to the rails 1 and 2. The circuit controlled by the relay P includes a source of energy 8 and any suitable means 9 for actuating or controlling the signal D which is moved to danger position indicated when the relay P is deënergized. In this position of the signal the contacts 6 and 7 are bridged thereby closing the circuit including the coil or winding R on the core or para-magnetic bar or mass $r$ extending across the rails 1 and 2, such circuit including also the source of current $R^{10}$ shown as a source of steady or direct current though it will be understood that with regard to some aspects of my invention such source may deliver fluctuating or alternating current.

T represents a car or vehicle having the wheels $t$ traveling upon the rails 1 and 2. Carried by the vehicle are the coils or windings S loosely enveloping the wheels which are of para-magnetic material, as iron or steel, and are usually connected by an axle of like material. These coils S are connected in a permanently closed circuit including the translating device $s$, here shown as an electromagnet having, as further illustrated in Fig. 2, the armature lever $s^1$ carrying the puncturing or fracturing device $s^2$, and normally held retracted by spring $s^3$.

The air pipe V forming a part of the air brake system on the vehicle or train is provided with a vent closed by frangible member $u$, in the form of a glass disk, in the path of the puncturing device $s^2$.

The operation is as follows: Assuming $R^{10}$ to be a source of direct current, as indicated, and assuming the vehicle T to be moving from right toward the left, if the block ahead of the vehicle, that is, the block to the left of the insulators 3, is occupied by another train or vehicle, as indicated by the wheels and axle 5, the relay P will be short circuited by the vehicle 5, and, the relay P being so deënergized, the local circuit including source 8 and device 9 will be closed, as shown, and the signal D will be moved to danger position indicated thereby closing the circuit through contacts 6 and 7 and the source $R^{10}$, and the coil R with the result that the core $r$ will be magnetized and will produce magnetism, magnetic flux or a magnetic field of substantially constant strength. If now the driver or engineman of vehicle T should pass the danger signal D, the wheels $t$ of the vehicle T will pass over the rails 1 and 2 immediately above the core $r$ and a magnetic flux will first increase and then diminish through the core $r$, the rails 1 and 2, and the wheels $t$ and their connecting axle, with the result that the magnetic flux first rising and then falling through the wheel coils S will induce in their circuit a current which energizes electro-magnet $s$; which will attract its armature $s^1$ and cause the member $s^2$ to fracture the disk $u$, thereby putting the air brake pipe V into communication with the outer atmosphere with the resultant setting of the brakes of vehicle T in the well known manner, bringing such vehicle to rest or decreasing its speed materially. And the brakes cannot be released until communication between the pipe V and the outer atmosphere is again shut off. The movement of the armature $s^1$ also operates as a signal to the driver or engineman, being itself a cab signal or being employed in any suitable way to control such a signal.

If the source $R^{19}$ delivers fluctuating or alternating current the core $r$ will produce correspondingly fluctuating or alternating magnetic flux which will operate by induction through the coils S to affect the translating device or electro-magnet $s$ in the same manner above described to give a signal and automatically apply the brakes.

By the arrangement described there is no air gap between the part of the magnetic circuit movable with the vehicle and the part of the magnetic circuit disposed in its path of travel, because of the rolling contact between the wheels $t$ and the rails. And the location of the coils of the vehicle circuit around the wheels is found to be of decided advantage.

While in Figs. 1 and 2 the vehicle wheels $t$ are employed in the magnetic functions, a separate rotary para-magnetic member, as $t^2$, Fig. 3, may move with the vehicle in rolling contact with para-magnetic material disposed in the path of travel of the vehicle and such member $t^2$ is enveloped by coil S connected in circuit as in Figs. 1 and 2 and controlling apparatus as in Figs. 1 and 2.

Having thus fully described the invention, what I claim as new, and desire to secure by Letters Patent is:

1. In a system of the character described, the combination with a running rail, of a movable vehicle, a current generating coil movable with said vehicle, and a vehicle wheel running on said rail within said coil.

2. In a system of the character described, a running rail, a movable vehicle, a current generating coil movable with said vehicle, a vehicle wheel running on said rail within said coil, and means for magnetizing said rail.

3. In a system of the character described, the combination with a running rail, of a movable vehicle, a current generating coil movable with said vehicle, vehicle controlling means controlled by current generated in said coil, a vehicle wheel running on said rail within said coil, and means for producing magnetic flux in a magnetic circuit of which said wheel is adapted to form a part.

4. In a system of the character described, the combination with a moving vehicle, of a para-magnetic mass disposed in the path of travel of said vehicle, a second para-magnetic mass movable with said vehicle and adapted to contact with said first named para-magnetic mass, means producing in one of said para-magnetic masses a substantially constant magnetic flux, a vehicle circuit inductively affected by change in magnetic flux resulting from relative movement of said para-magnetic masses, and a signaling device controlled by said circuit.

5. In a system of the character described, the combination with a moving vehicle, of a para-magnetic mass disposed in the path of travel of said vehicle, a second para-magnetic mass movable with said vehicle and adapted to contact with said first named para-magnetic mass, means producing in one of said para-magnetic masses a substantially constant magnetic flux, a vehicle circuit inductively affected by change in magnetic flux resulting from relative movement of said para-magnetic masses, and vehicle speed controlling means controlled by said circuit.

6. In a system of the character described, the combination with a moving vehicle, of a para-magnetic mass disposed in the path of travel of said vehicle, a para-magnetic mass movable with said vehicle rolling in contact with said first named mass, a vehicle circuit enveloping said rolling mass inductively affected through said para-magnetic masses, and a signaling device controlled by said circuit.

7. In a system of the character described, the combination with a moving vehicle, of a para-magnetic mass disposed in the path of travel of said vehicle, a para-magnetic mass movable with said vehicle rolling in contact with said first named mass, a vehicle circuit enveloping said rolling mass inductively affected through said para-magnetic masses, and vehicle brake controlling means controlled by said circuit.

8. In a system of the character described, the combination with a para-magnetic rail, a para-magnetic mass in magnetic relation with said rail, a moving vehicle, a para-magnetic wheel movable with said vehicle in contact with said rail, a permanently closed vehicle circuit a part of which envelops said wheel, and a translating device included in said circuit.

9. In a system of the character described, the combination with a para-magnetic rail, a para-magnetic mass in magnetic relation with said rail, a moving vehicle, a para-magnetic wheel movable with said vehicle in contact with said rail, a permanently closed vehicle circuit a part of which envelops said wheel, and a signaling device controlled by said circuit.

10. In a system of the character described, the combination with a para-magnetic rail, a para-magnetic mass in magnetic relation with said rail, a moving vehicle, a para-magnetic wheel movable with said vehicle in contact with said rail, a permanently closed vehicle circuit a part of which envelops said wheel, and vehicle speed controlling means controlled by said circuit.

11. In combination, two track rails, a core across the track rails and below the wheel-bearing surface thereof, a coil surrounding said core, a source of current for said coil, a vehicle, a pair of wheels and their connecting axle carried by said vehicle, said wheels having a rolling contact with said track rails and forming a magnetic path or circuit with the track rails, and a coil carried by the vehicle and surrounding one of said wheels below its axle so as to cut magnetic flux flowing in said magnetic path.

12. In combination, two track rails, a core across the track rails and below the wheel-bearing surface thereof, a coil surrounding said core, a source of current for said coil, a vehicle, a pair of wheels and their connecting axle carried by said vehicle, said wheels having a rolling contact with said track rails and forming a magnetic path or circuit with the track rails, and coils carried by the vehicle and surrounding the said wheels below their connecting axle so as to cut magnetic flux flowing in said magnetic path.

13. In combination, two track rails, a core across the track rails and below the wheel-bearing surface thereof, a coil surrounding said core, a source of direct current for said coil, a vehicle, a pair of wheels and their connecting axle carried by said vehicle, said wheels having a rolling contact with said track rails and forming a magnetic path with the track rails, coils carried by the vehicle and surrounding the said wheels below their connecting axle, a circuit on the vehicle including said coils, and an electro-magnetic device on the vehicle also included in said circuit.

14. In combination, two track rails, a core across the track rails and below the wheel-bearing surface thereof, a coil surrounding said core, a source of current for said coil, a vehicle, a pair of wheels and their connecting axle carried by said vehicle, said wheels having a rolling contact with said track rails and forming a magnetic path with the track rails, coils carried by the vehicle and surrounding the said wheels below their connecting axle, a circuit on the vehicle including said coils, an electro-magnetic device also included in said circuit, and means controlled by said electro-magnetic device for causing an application of the brakes carried by the vehicle.

15. In combination, two track rails, a core across the track rails and below the wheel-bearing surface thereof, a coil surrounding said core, a source of current for said coil, means for controlling the circuit of said coil, a vehicle, a pair of wheels and their connecting axle carried by said vehicle; said wheels having a rolling contact with said track rails and forming a magnetic path with the track rails, coils carried by the vehicle and surrounding the said wheels below their connecting axle, a circuit on the vehicle including said coils, and an electro-magnetic device on the vehicle also included in said circuit.

16. In combination, means carried by a vehicle for causing an application of the brakes thereof, an electro-magnetic device for controlling said means, a closed circuit carried by the train and including said electro-magnetic device, a coil surrounding a wheel of said vehicle and adjacent the track and also included in said closed circuit, an electro-track magnet for co-acting with the wheel coil, a source of current for the track magnet, and means for controlling the supply of current to the electro-track magnet.

17. A generator having a field magnet formed by a magnetic portion in a permanent line of way, and an armature for said field magnet comprising a wheel carried by a vehicle traveling along the permanent way and surrounded by a coil.

18. The combination with a magnetic path formed in part by a permanent line of way, a vehicle having rolling contact with said permanent line of way and at times forming a part of said magnetic path as it travels along the permanent line of way, and a coil on the vehicle for generating an electro-motive force due to the varying flux caused by the vehicle passing through the magnetic path in the permanent line of way, and a signaling device in circuit with said coil.

19. In combination a permanent way, direct current means for producing a magnetic field of substantially constant strength in a rail comprised in the permanent way, a vehicle, means carried by the vehicle for making mechanical contact with said rail so as to be included in the magnetic field of the rail, and a coil on the vehicle for generating an electro-motive force due to passage of flux through said coil due to vehicle movement, whereby movement of said wheels and coil with respect to said magnet induces electro-motive force in said coil.

20. In a system of the character described, the combination with a moving vehicle, a para-magnetic mass disposed in the path of travel of said vehicle, a vehicle wheel through which and said mass magnetic flux is adapted to pass, a coil enveloping said wheel, a translating device, and a circuit including said translating device and said coil in which current is induced by changes of magnetic flux through said wheel.

21. The combination with a rail of magnetic material, of a magnetic wheel making contact therewith, and a current generating coil surrounding said wheel.

22. The combination with a rail of magnetic material, of a magnetic wheel making contact therewith, and a coil loosely enveloping said wheel and inductively affected by magnetic flux passing through the contact between said rail and wheel.

23. The combination with a rail, of means for producing magnetic flux associated therewith in the roadway, a wheel making traveling contact with said rail, and a current generating coil loosely enveloping said wheel.

24. The combination with a plurality of rails, a wheel making contact with each of said rails, a current generating coil loosely enveloping each wheel, and a circuit in which said coils are connected.

25. The combination with a pair of rails of magnetic material, of a pair of wheels of magnetic material making contact therewith, a magnetic connection between said wheels, and a current generating coil surrounding a wheel.

26. The combination with a pair of rails of magnetic material, of a pair of wheels of magnetic material making contact therewith, a magnetic connection between said wheels, and a current generating coil loosely enveloping a wheel.

27. The combination with a pair of running rails of magnetic material, magnetic material extending across said rails, a pair of wheels and an axle of magnetic material, said wheels making contact with said rails, and a current generating coil loosely enveloping a wheel between said axle and a rail.

28. The combination with a traveling wheel, of a coil loosely enveloping the same, and means disposed in the path of travel of said wheel for producing a magnetic field for inductively influencing said coil.

29. The combination with a traveling wheel, of a coil surrounding said wheel between its center and its tread, and means disposed in the path of travel of said wheel for inductively influencing said coil.

30. In a system of the character described, the combination with a moving vehicle, of a wheel upon which said vehicle travels, a current generating coil surrounding said wheel, a vehicle circuit in which said coil is connected, and a mass of magnetic material located in the path of travel of said vehicle in coöperative relation with said coil.

31. In a system of the character described, the combination with a moving vehicle, of a wheel upon which said vehicle travels, a current generating coil surrounding said wheel, a permanently closed vehicle circuit in which said coil is connected, and a mass of magnetic material located in the path of travel of said vehicle in coöperative relation with said coil.

32. In a system of the character described, the combination with a moving vehicle, of a wheel upon which said vehicle travels, a current generating coil disposed between the center and tread of said wheel and surrounding said wheel, a vehicle circuit, a translating device controlled thereby, and a para-magnetic mass disposed in the path of travel of said vehicle in coöperative relation with said coil.

33. In a system of the character described, the combination with a moving vehicle, of a wheel upon which said vehicle travels, a current generating coil disposed between the center and tread of said wheel and surrounding said wheel, a permanently closed vehicle circuit, a translating device controlled thereby, and a para-magnetic mass disposed in the path of travel of said vehicle in coöperative relation with said coil.

34. In a system of the character described, the combination with a moving vehicle, of a wheel on which said vehicle travels, a current generating coil movable with said vehicle loosely enveloping said wheel, a vehicle circuit including said coil, and means disposed in the path of travel of said vehicle for producing a magnetic field.

35. In a system of the character described, the combination with a moving vehicle, of a wheel on which said vehicle travels, a current generating coil movable with said vehicle loosely enveloping said wheel, a vehicle circuit including said coil, means disposed in the path of travel of said vehicle for producing a magnetic field, and means external to said vehicle for controlling said means.

36. In a system of the character described, the combination with a moving vehicle, of a wheel on which said vehicle travels, a current generating coil movable with said vehicle loosely enveloping said wheel, a vehicle circuit including said coil, means disposed in the path of travel of said vehicle for producing a magnetic field, and means responsive to condition of the path of travel of said vehicle controlling said means.

37. In a system of the character described, the combination with a moving vehicle, of a vehicle circuit, a translating device controlled thereby, a vehicle wheel, a current generating coil in said circuit enveloping said wheel, means disposed along the path of travel of said vehicle for producing a magnetic field for inductively influencing said circuit, a signal disposed along the path of travel of said vehicle, and means controlling said means in accordance with conditions of said signal.

38. In a system of the character described, the combination with a moving vehicle, of a vehicle circuit surrounding a wheel of said vehicle, a signaling device in said circuit, a para-magnetic bar located in and transversely of the path of travel of said vehicle, a second electric circuit, a coil in said second circuit surrounding said bar, and a source of current in said second circuit.

39. In a system of the character described, the combination with a moving vehicle, of a vehicle circuit surrounding a wheel of said vehicle, a signaling device in said circuit, a para-magnetic bar located in and transversely of the path of travel of said vehicle, a second electric circuit, a coil in said second circuit surrounding said bar, a source of current in said second circuit, and means for varying the electrical condition of said second circuit.

40. In a system of the character described, the combination with a rail, of a vehicle movable thereover, a para-magnetic mass movable with said vehicle in contact with said rail, a coil surrounding said mass, a translating device controlled by said coil, means disposed in the path of travel of said vehicle for producing a magnetic field adapted to affect the magnetic condition of said mass, and means external to said vehicle for controlling said means in response to changes in traffic conditions of said path of travel.

41. In a system of the character described, the combination with a moving vehicle, of a para-magnetic mass movable with said vehicle, a coil surrounding said mass, a para-magnetic mass disposed in the path of travel of said vehicle, a coil surrounding said last named mass, and a signaling device controlled by one of said coils, said para-magnetic masses adapted to form a magnetic circuit when said vehicle reaches a predetermined point in its travel.

42. In a system of the character described, the combination with locally oppositely magnetically polarized running rails, of a pair of wheels and axle movable over said rails and adapted to be traversed by magnetic flux from said rails, a coil movable with and loosely enveloping a wheel, and a translating device controlled by said coil.

43. In a system of the character described, the combination with locally oppositely magnetically polarized running rails, of a pair of wheels and axle movable over said rails and adapted to be traversed by magnetic flux from said rails, a coil movable with and loosely enveloping a wheel, a translating device controlled by said coil, and means responsive to the traffic condition of said rails controlling their polarization.

44. In a system of the character described, the combination with a movable vehicle, of a vehicle circuit enveloping a wheel of said vehicle, vehicle speed reducing means controlled by said circuit, and means disposed along the path of travel of said vehicle responsive to danger condition for producing a magnetic field for inductively influencing said circuit.

45. In a system of the character described, the combination with a moving vehicle, of a vehicle circuit enveloping a wheel of said vehicle, vehicle speed controlling means controlled by said circuit, a para-magnetic bar disposed in the path of travel of said vehicle, a second electric circuit, a coil in said second circuit surrounding said bar, a source of current in said second circuit, and means responsive to traffic conditions for varying the current in said second circuit.

In testimony whereof I have signed my name to this specification in the presence of two subscribing witnesses.

GEORGE P. FINNIGAN.

Witnesses:
Geo. B. Bull,
Herman Notte.